United States Patent
Dzialakiewicz et al.

(10) Patent No.: US 6,974,117 B2
(45) Date of Patent: Dec. 13, 2005

(54) PROPORTIONAL VALVE ACTUATING APPARATUS

(75) Inventors: Paul Dzialakiewicz, South Bend, IN (US); William H. Nash, South Bend, IN (US); Peter G. Hutchings, Granger, IN (US)

(73) Assignee: South Bend Controls, Inc., South Bend, IN (US)

( * ) Notice: Subject to any disclaimer, the term of this patent is extended or adjusted under 35 U.S.C. 154(b) by 0 days.

(21) Appl. No.: 10/649,253

(22) Filed: Aug. 27, 2003

(65) Prior Publication Data

US 2005/0045840 A1    Mar. 3, 2005

(51) Int. Cl.⁷ .............................................. F16K 31/02
(52) U.S. Cl. ..................... 251/129.008; 251/129.16; 251/129.18; 335/279
(58) Field of Search .......... 251/129.08, 129.15–129.18; 335/261, 279, 281

(56) References Cited

U.S. PATENT DOCUMENTS

| | | | |
|---|---|---|---|
| 3,423,062 A | 1/1969 | Grayson | |
| 3,796,229 A | 3/1974 | Wright | |
| 3,960,361 A | 6/1976 | York | |
| 4,349,045 A | 9/1982 | Kah, Jr. | |
| 4,463,332 A | 7/1984 | Everett | |
| 4,527,590 A | 7/1985 | Kolze | |
| 4,767,097 A | 8/1988 | Everett et al. | |
| 4,834,337 A * | 5/1989 | Chorkey et al. | ....... 251/129.18 |
| 4,954,799 A | 9/1990 | Kumar | |
| 4,986,308 A | 1/1991 | Champseaux | |
| 5,027,857 A | 7/1991 | Champseix | |
| 5,199,462 A | 4/1993 | Baker | |
| 5,232,196 A | 8/1993 | Hutchings et al. | |
| 5,653,422 A | 8/1997 | Pieloth et al. | |
| 5,762,097 A | 6/1998 | Hettinger et al. | |
| 5,785,297 A * | 7/1998 | Ha | ........................ 251/129.14 |
| 5,799,696 A | 9/1998 | Weiss | |
| 5,983,941 A | 11/1999 | Fritz et al. | |
| 6,224,033 B1 | 5/2001 | Kumar | |
| 6,325,354 B1 | 12/2001 | Hoen et al. | |
| 6,394,136 B1 | 5/2002 | Rohrbeck | |
| 6,460,558 B2 | 10/2002 | Anderson | |
| 6,484,754 B1 | 11/2002 | Muth et al. | |
| 6,715,732 B2 * | 4/2004 | Kumar | .................. 251/129.16 |

FOREIGN PATENT DOCUMENTS

| | | |
|---|---|---|
| FR | 2 671 597 A1 | 7/1992 |
| JP | 7063273 A2 | 3/1995 |
| WO | WO 00/03166 | 1/2000 |
| WO | PCT/US2004/028036 | 8/2004 |

\* cited by examiner

*Primary Examiner*—Steven O. Douglas
(74) *Attorney, Agent, or Firm*—Baker & Daniels (57) ABSTRACT

A valve actuating apparatus for providing proportional control of a fluid flow that includes a housing having a valve body with an inlet port and an outlet port. In one embodiment, the valve actuating apparatus also has a valve assembly including an armature, a movable fluid control member, and at least one spring biasing the armature into contact with the fluid control member. The valve actuating apparatus further includes a solenoid assembly having an electromagnetic coil and a pole piece. The pole piece and the armature define a gap that changes proportionally with the amount of current flowing through the electromagnetic coil. Fluid flow from the inlet port to the outlet port may proportionally increase or decreases as the gap increases or decreases. The valve actuating apparatus may further include a valve seat. The fluid control member may be in contact with the valve seat to inhibit fluid flow through the apparatus when the electromagnetic coil is not energized.

36 Claims, 6 Drawing Sheets

PROPORTIONAL VALVE ACTUATING APPARATUS

BACKGROUND OF THE INVENTION

This invention relates to a valve actuating apparatus for controlling fluid flow, and in particular, to a valve actuating apparatus for providing proportional control of the fluid flow from an inlet port to an outlet port in a valve body of the apparatus.

In one type of a known conventional solenoid operated valve, a plunger of magnetic material is slidable within the solenoid. A spring or other biasing means urges the plunger into contact with a valve seat. When no current is applied to the solenoid, the valve is maintained closed by the spring. When current flows and the solenoid is energized, a magnetic force acts against the spring to move the plunger away from the valve seat. When the magnetic force exceeds the force of the spring, the plunger moves out of contact with the valve seat into a remote position in which the valve is fully open. A valve of this type has two basic positions, open and closed.

A proportional valve is one in which the flow of fluid varies in proportion to the current supplied to a coil in the solenoid. Such a valve may be desirable for applications in which a gradual variation in flow is preferable to an abrupt change between on and off conditions.

Many designs have been proposed for proportional valves. An example of a known proportional valve is shown in U.S. Pat. No. 4,463,332 to W. Everett, incorporated herein by reference. The proportional valve in the '332 Patent includes a solenoid having an electromagnetic coil and a pole piece. The pole piece is located within the electromagnetic coil, and an armature is located near the pole piece and separated therefrom by a core gap. The pole piece is mounted in the solenoid with a threaded engagement which can be adjusted to adjust the core gap. The armature is held in place by an armature retainer, and a pair of flat springs are held between the armature retainer and the armature. The solenoid in the '332 Patent also includes an annular permanent magnet surrounding the coil to create a field of predetermined flux density in the pole piece. The solenoid assembly in the '332 Patent is shown coupled to a valve assembly which utilizes a ball valve.

U.S. Pat. No. 4,767,097 to Everett et al., incorporated herein by reference, discloses a proportional valve somewhat similar to that of the '332 Patent, but which utilizes a different ball valve assembly and housing.

SUMMARY OF THE INVENTION

In one embodiment, the invention includes a valve actuating apparatus for providing proportional control of a fluid flow and includes a housing having a valve body with an inlet port and an outlet port. The valve actuating apparatus also has a valve assembly including an armature, a movable fluid control member, and at least one spring biasing the armature into contact with the fluid control member. The valve actuating apparatus further includes a solenoid assembly having an electromagnetic coil and a pole piece. The pole piece and the armature define a gap that decreases proportionally to the amount of current flowing through the electromagnetic coil. Fluid flow from the inlet port to the outlet port may proportionally increase as the gap decreases without the need for a permanent magnet in the assembly.

The valve actuating apparatus may further include a valve seat, wherein the fluid control member is in contact with the valve seat to inhibit fluid flow through the apparatus when the electromagnetic coil is not energized. The fluid control member may be a ball, and the valve actuating apparatus may further include a core member having a central opening and a shoulder. The armature and the spring may be located substantially within the core member.

In one embodiment, the armature includes a shoulder, and the spring is positioned between the shoulder on the armature and the shoulder on the core. The spring may be a flat spring and have a substantially circular configuration with a central hole. A portion of the armature may be inserted through the hole, and the shoulder on the armature may have an outer diameter that is greater than the hole.

It is also a feature of the invention to provide an embodiment that further includes a second spring having a diameter that is greater than a diameter of the first spring. The second spring may be positioned between a second shoulder on the core member and a second shoulder on the armature. Both of the springs may be flat springs with centrally located holes, and a portion of the armature may be inserted through the holes. The hole of the second spring may have a diameter that is greater than an outer diameter of the first shoulder of the armature and smaller than an outer diameter of the second shoulder of the armature.

It is also a feature of the invention to provide another embodiment of a valve actuating apparatus that provides proportional control of a fluid flow and includes a housing having a valve body with an inlet port and an outlet port. The valve actuating apparatus also includes a valve assembly having an armature with first and second shoulders, and first and second springs for biasing the armature. The valve actuating apparatus also has a solenoid assembly that includes an electromagnetic coil, a core member and a pole piece. The core member may have a central bore and first and second shoulders. The first spring may be positioned between the first shoulder on the armature and the first shoulder on the core member, and the second spring may be positioned between the second shoulder on the armature and the second shoulder on the core member. The pole piece and the armature define a gap that decreases proportionally to the amount of current flowing through the electromagnetic coil.

Both the springs may be flat springs, and one of the springs may have a diameter that is greater than the other. Both of the springs may have centrally located holes, and a portion of the armature may be inserted through the holes. The hole of the second spring may a diameter that is greater than an outer diameter of the first shoulder of the armature and smaller than an outer diameter of the second shoulder of the armature.

In one embodiment, the valve actuating apparatus further includes a movable fluid control member. The springs may bias the armature into contact with the fluid control member. The valve actuating apparatus may further include a valve seat, wherein the fluid control member may be in contact with the valve seat to inhibit fluid flow through the apparatus when the electromagnetic coil is not energized. The fluid control member may be a ball.

It is also a feature of the invention that in one embodiment, the inlet port is pressurized and pushes the fluid control member against the armature regardless of the size of the gap.

An additional feature of the invention is to provide an embodiment of a valve actuating apparatus that provides proportional control of a fluid flow and includes a housing having a valve body with an inlet port and an outlet port. The valve actuating apparatus includes a valve assembly having an armature with first and second shoulders with different outer diameters, and first and second springs. The first spring may be positioned against the first shoulder of the armature, and the second spring may be positioned against the second shoulder of the armature. The valve actuating apparatus also has a solenoid assembly that includes an electromagnetic coil and a pole piece. The pole piece and the armature define a gap that decreases proportionally to the amount of current flowing through the electromagnetic coil.

The springs may be flat springs with different diameters. At least one of the springs may have a centrally located hole, and a portion of the armature may be inserted through the hole so that the spring with the hole bears against one of the shoulders of the armature.

Yet, another feature of the invention is to provide an embodiment wherein both of the springs have holes, and a portion of the armature is inserted through the holes. The hole of the second spring may have a diameter that is greater than the outer diameter of the first shoulder of the armature and smaller than the outer diameter of the second shoulder of the armature.

The valve actuating apparatus may further include a movable fluid control member. The springs may bias the armature in contact with the fluid control member. The valve actuating apparatus may further include a valve seat. The fluid control member may be in contact with the valve seat to inhibit fluid flow through the apparatus when the electromagnetic coil is not energized.

In one embodiment of the valve actuating apparatus, the fluid control member is a ball. The fluid control member may be movable relative to both the armature and the valve seat. The fluid may be pressurized and push the fluid control member against the armature regardless of the gap.

Another feature of the invention is to provide an embodiment of a valve actuating apparatus that provides proportional control of a fluid flow and includes a housing having a valve body with an inlet port and outlet port. The valve actuating apparatus has a valve assembly that includes an armature, and first and second flat springs with different diameters. The springs each have a through hole, and a portion of the armature is inserted through the holes in the springs. The valve actuating apparatus also includes a solenoid assembly having an electromagnetic coil and a pole piece. The pole piece and the armature define a gap that decreases proportionally to the amount of current flowing through the electromagnetic coil. The valve actuating apparatus may provide proportional control of the fluid flow without the need for a permanent magnet in the assembly.

The valve actuating apparatus may also include a sealing member and a third spring. The third spring may bias the sealing member. The apparatus may also include a cap such that the spring biases the sealing member towards the cap.

Corresponding reference characters indicate corresponding parts throughout the several views. Although the drawings represent embodiments of the present invention, the drawings are not necessarily to scale and certain features may be exaggerated in order to better illustrate and explain the present invention. The discussion that follows illustrates certain embodiments of the invention and is not to be construed as limiting the scope of the invention in any manner.

DETAILED DESCRIPTION OF EMBODIMENTS OF THE INVENTION

The embodiments disclosed below are not intended to be exhaustive or to limit the invention to the precise forms disclosed in the detailed description. Rather, the embodiments are chosen and described so that others skilled in the art might utilize their teachings.

Figure 1:
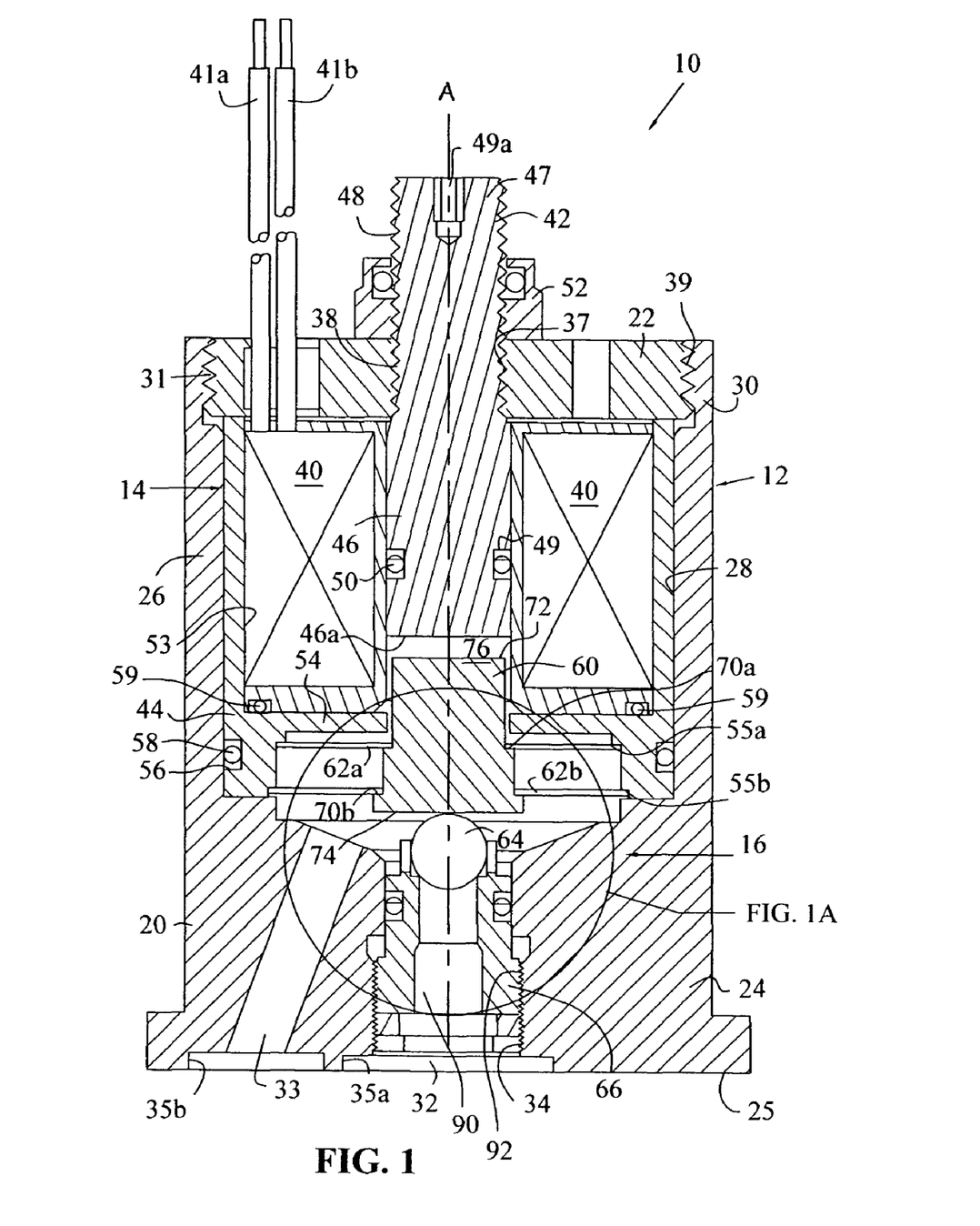
FIG. 1 is a cross-sectional view of a proportional valve actuating apparatus taken through a longitudinal axis of the apparatus and showing the valve in the closed position that prohibits fluid from flowing from an inlet port into an outlet port.
Figure 2:
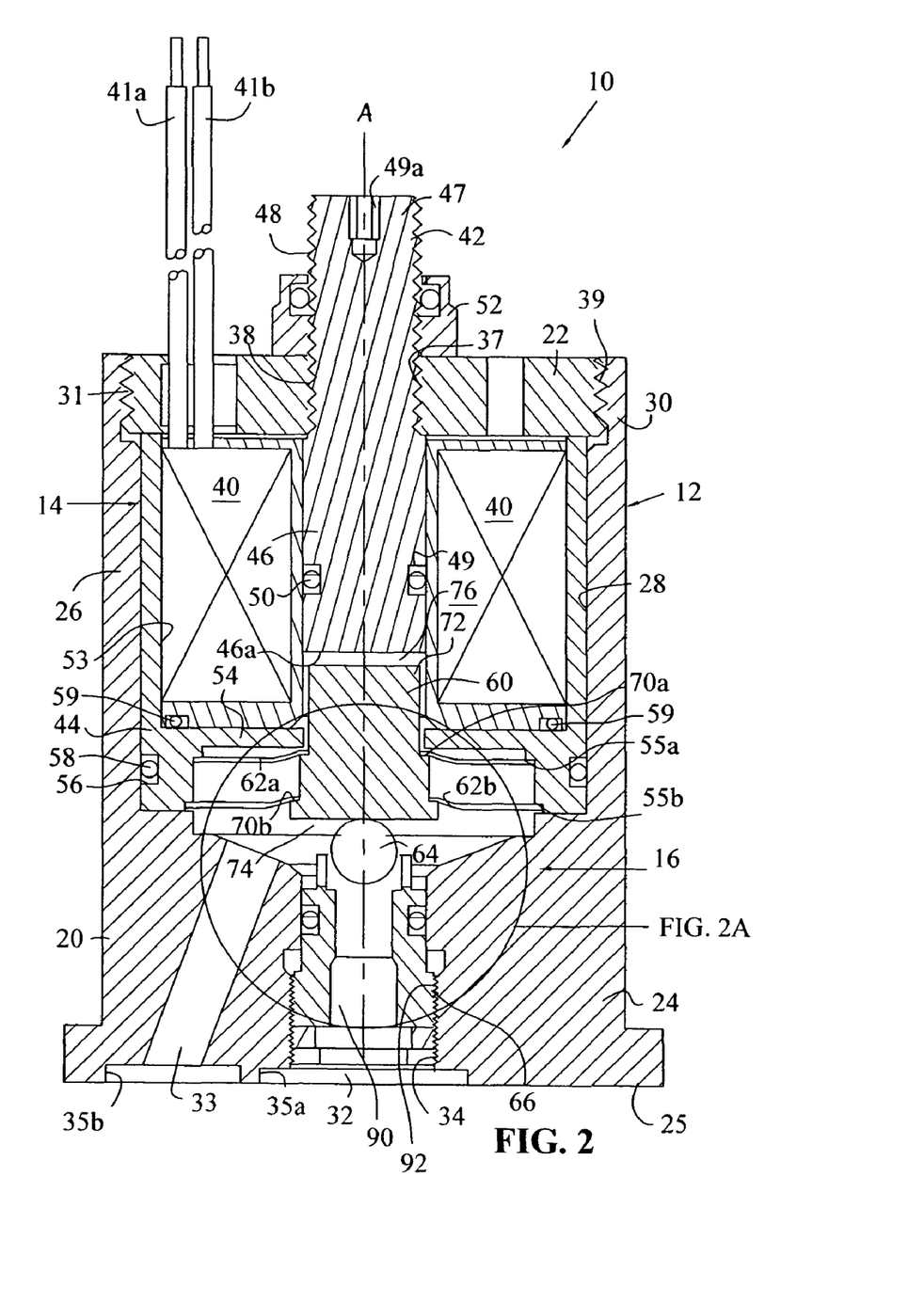
FIG. 2 is a cross-sectional view of the valve actuating apparatus taken in the same plane as FIG. 1 showing the valve in an open position allowing fluid to flow from the inlet port to the outlet port when an electromagnetic coil is energized.

Now referring to FIGS. 1–2, an embodiment of a valve actuating apparatus is designated as 10. The valve actuating apparatus includes a housing generally indicated as 12, a solenoid assembly generally indicated as 14 and a valve assembly generally indicated as 16.

Housing 12 includes a valve body 20 and an end piece 22. The valve body 20 includes a lower portion 24 having a bottom surface 25 and an upper portion 26 having a bore 28 therein. Upper portion 26 also includes an upper end 30, wherein bore 28 is slightly enlarged and has internal threads 31 for receiving the end piece 22.

Valve body 20 also includes an inlet passage 32 and an outlet passage or port 33. Both inlet passage 32 and outlet passage 33 extend from the bottom surface 25 through lower portion 24 of valve body 20 into bore 28. Inlet passage 32 also includes internal threads 34 extending along a portion thereof. Inlet passage 32 and outlet passage 33 may also each contain a counterbore 35a, 35b, respectively, for receipt of fittings or O-rings to connect fluid conduits (not shown) to carry a fluid (not shown) to and from the valve body.

End piece 22 has a generally disc-like shape with a centrally located bore 37 having internal threads 38. End piece 22 also has external threads 39 extending about the outer circumference thereof. External threads 39 are threadably engageable with internal threads 31 of the upper end 30 of the valve body.

The solenoid assembly 14 includes an electromagnetic coil 40, electrical leads 41a, 41b, a pole piece 42, and a core member 44. Electrical leads 41a, 41b provide electrical current to the electromagnetic coil 40 and extend through an opening in the end piece 22. The electromagnetic coil 40 is of a standard design and well known in the art. Pole piece 42 is manufactured from a ferromagnetic material and includes a lower portion 46 having a bottom surface 46a positioned within the electromagnetic coil 40, and an upper portion 47 extending through bore 37 of end piece 22. The upper portion 47 includes external threads 48 that are engageable with threads 38 of the end piece and an adjustment recess 49a for receiving a screw driver, hex wrench, or other adjustment mechanism (not shown). The lower portion 46 of the pole piece includes a groove 49.

The solenoid assembly 14 also includes an O-ring or other sealing member 50 located in groove 49 of the pole piece to preclude fluid from escaping between the pole piece and the electromagnetic coil. Also, a locking nut 52 is located on external threads 48 of the upper portion 47 of the pole piece and is tightened against the end piece 22.

Core member 44 of the solenoid assembly has a generally cylindrical configuration and is located in bore 28 of the valve body. Core member 44 also has a central bore 53 in which the electromagnetic coil 40 is contained. Core member 44 further includes an internal flange 54 and a pair of annular shoulders 55a, 55b extending circumferentially about the lower end of central bore 53. Shoulder 55b is spaced further from a central axis A than shoulder 55a such that the diameter of central bore 53 is greater adjacent shoulder 55b than shoulder 55a. Core member 44 also includes an outer circumferential groove 56 for receipt of an O-ring or other sealing member 58 to preclude fluid from escaping between the core member 44 and upper portion 26 of the valve body 20. Another O-ring 59 is located between the bottom end of coil 40 and internal flange 54 to preclude fluid from escaping between the coil and the core member.

The valve assembly 16 of valve actuating apparatus 10 includes an armature 60, a pair of springs 62a, 62b, a fluid control member 64, and a valve insert 66. Armature 60 is comprised of a ferromagnetic material and has a generally cylindrical configuration. The armature includes a pair of shoulders 70a, 70b that extend about the outer circumference of the armature. It should be noted that the diameter of the armature is wider at shoulder 70b than at shoulder 70a. Armature 60 also includes an upper surface 72 and a lower surface 74. The upper surface 72 of the armature and the bottom surface 46a of pole piece 42 define a gap 76, as will be described more fully below.

Figure 3:
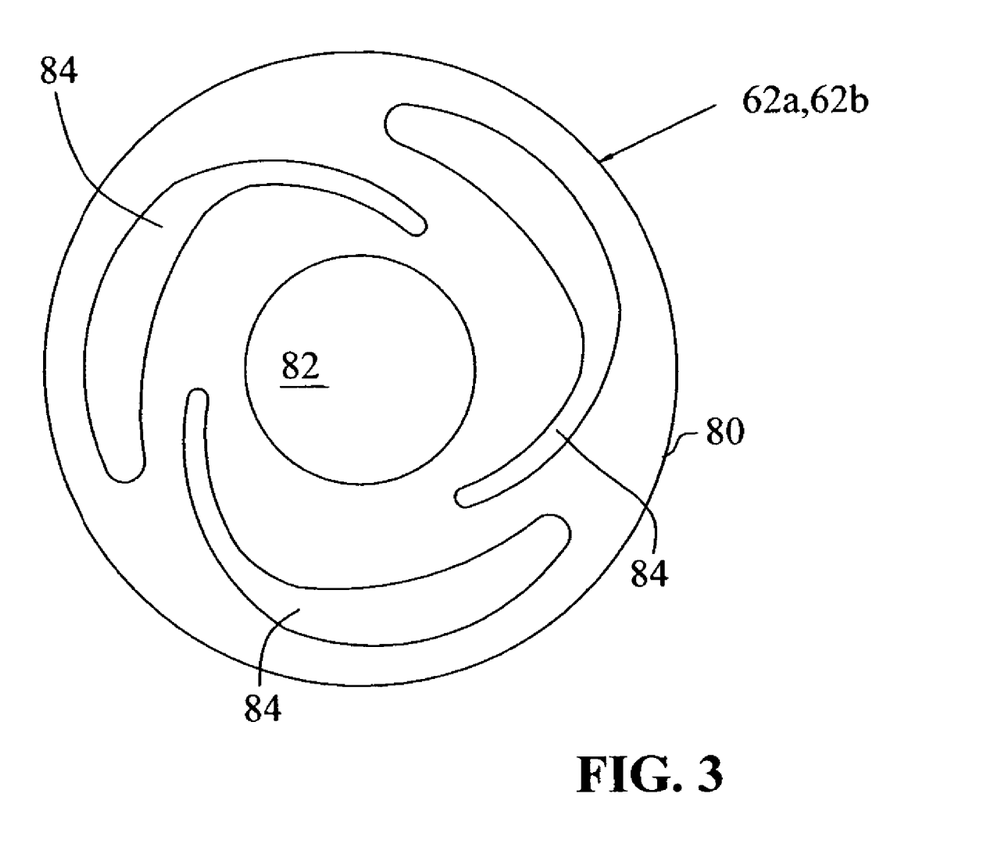
FIG. 3 is a top plan view of a flat spring used in the valve actuating apparatus.

Spring 62a of valve assembly 16 has a generally flat disc-like configuration (FIG. 3) and is preferably made from a non-magnetic corrosion resistant material. Spring 62a has an outer circumference 80 that defines its diameter. Spring 62a also has a centrally located hole 82 and arcuate slots 84 radiating outwardly in a spiral-like configuration around the central hole to provide the desired mechanical stress to deflection relationship of the springs. Spring 62b is similar in configuration to spring 62a except that spring 62b has a larger circumference 80 and diameter, as well as, a larger centrally located hole 82 than spring 62a. The springs may be manufactured using known chemical etching techniques. In one embodiment, the springs are relatively high rate springs with a rating of 150 to 500 psi.

Figure 1A:
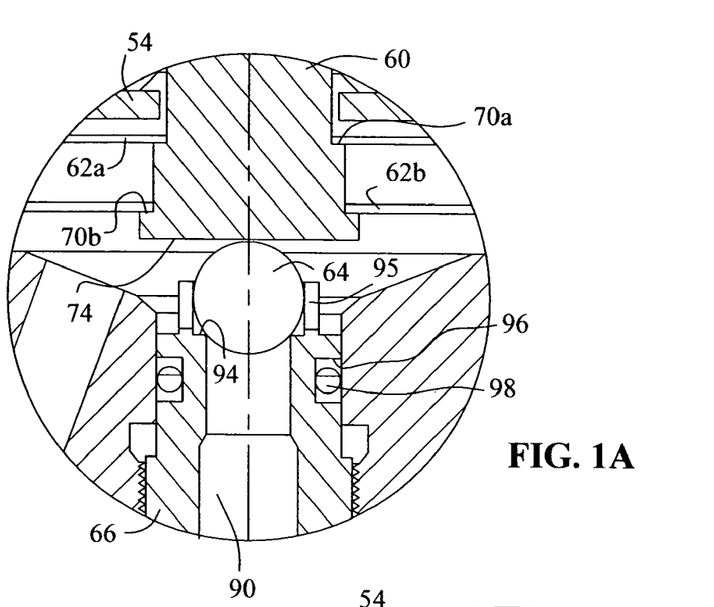
FIG. 1A is a close up view taken as shown in FIG. 1 of a fluid control ball biased against a valve seat of the apparatus.

The valve insert 66 of valve assembly 16 has a generally cylindrical configuration and includes an inlet port 90 extending therethrough and external threads 92 for engaging internal threads 34 of inlet passage 32. Valve insert 66 also includes a valve seat 94 and a circular flange 95 extending upward from the valve seat. Circular flange 95 is configured for receipt of the fluid control member 64, which in the embodiment shown, is a ball (FIG. 1A). Valve insert 66 also includes an outer circumferential groove 96 for receipt of an O-ring or other sealing member 98 to preclude fluid leakage between the valve body 20 and the valve insert 66.

When assembled as shown in the figures, the solenoid assembly 14 is mounted within bore 28 of the valve body 20. Prior to the insertion of the solenoid assembly in the valve body, the armature 60 and springs 62a, 62b are placed within the core member 44. A portion of the armature 60 is inserted through the central holes 82 of springs 62a, 62b, such that spring 62a bears against shoulder 70a of the armature, and spring 62b bears against shoulder 70b of the armature. As such, shoulder 70a of the armature, has an outer diameter that is smaller than and will pass through central hole 82 of spring 62b, but is greater than and will not pass through central hole 82 of spring 62a. Additionally, the outer portion of spring 62a bears against shoulder 55a of core member 44, and the outer portion of spring 62b bears against shoulder 55b of the core member. Also, as can be seen in the figures, the diameter of spring 62a is smaller than that of shoulder 55b so that spring 62a fits past shoulder 55b.

To retain the solenoid assembly within housing 12, end piece 22 is screwed into the valve body, such that external threads 39 on the end piece engage internal threads 31 of the upper portion 26 of the valve body. External threads 48 on the upper portion 47 of pole piece 42 are threaded with internal threads 38 in the central bore 37 of the end piece to locate the pole piece at the desired position. As should be appreciated, rotation of the pole piece 42, as discussed below, will vary its vertical position, which in turn, will vary the gap 76. Lock nut 52 serves to lock the pole piece in place when the desired position is attained. Also, when the apparatus is assembled as shown in the figures, O rings 50, 58, and 59 will inhibit the fluid from escaping through bore 28 out the upper end 30 of the housing.

In the lower portion 24 of the valve body, valve insert 66 is threaded into inlet passage 32 of valve body 20 by engaging the external threads 92 of the valve insert with internal threads 34 of the inlet passage. The fluid control member 64 is placed within the circular flange 95 prior to assembly of the valve insert into the valve body. The valve insert is threaded into inlet passage 32 far enough that O rings 98 will seal with lower portion 24 of the valve body and so that the fluid control member is pressed against the lower surface 74 of the armature 60. Accordingly, in this position, spring 62a and spring 62b will bias the armature to push the fluid control member 64 into contact with valve seat 94 (FIG. 1A).

In operation, the armature will assume a first or closed position as shown in FIGS. 1 and 1A when the electromagnetic coil 40 is not energized. As current is provided through electrical leads 41a, 41b to the electromagnetic coil 40, a magnetic field will be established in pole piece 42, which will attract the armature 60 towards it. Of course, springs 62a, 62b, which bear against shoulders 70a, 70b, respectively, of the armature, will provide a resistance against the armature moving toward the pole piece. The resistance/tension and resulting flexure in the springs will depend upon the thickness and material used. The tension and flexure in the springs will increase as the current supplied by electrical leads 41a, 41b is increased. The increased current results in more magnetic attraction between the pole piece and the armature so that the gap 76 is proportionally reduced as the current increases. It should also be noted that in order to maintain the proportionality of the valve, the springs should be sized such that under the maximum current spring 62a does not come into contact with internal flange 54 of core member 44 and so that upper surface 72 of the armature 60 does not contact the bottom surface 46a of pole piece 42. Note that in the present invention, the armature is fully supported by the springs and does not experience the sliding friction that occurs in many other valves.

Figure 2A:
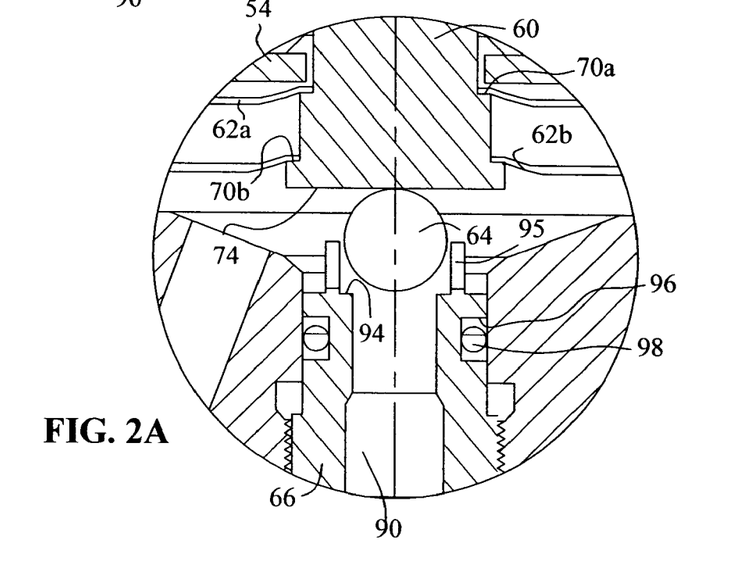
FIG. 2A is a close up view taken as shown in FIG. 2, wherein the fluid control ball is separated from the valve seat to permit the fluid flow.

It should also be noted that the inlet fluid should be kept under pressure. This will force the fluid control member 64 upward so that it remains in contact with the lower surface 74 of the armature as the armature raises and lowers in response to the magnetic field produced by the current supplied to coil 40. Of course, as the fluid control member moves upward with the armnature, it will become displaced from the valve seat 94, and thus allow the fluid to flow from the inlet port 90 to the outlet port 33. The more current that is provided to the coil, the stronger the magnetic field will be, and the farther the armature will move upward to reduce gap 76. Accordingly, the amount of displacement of the fluid control member 64 from the valve seat 94 will coincide directly with the movement of the armature providing proportional control of the fluid flow. During the movement of the armature, the circular flange 95 prevents the fluid control member 64 from being dislocated away from the inlet port 90 as shown in FIG. 2A.

If the current is reduced, the armature will move downward and proportionally reduce the fluid flow as the displacement of the fluid control member from the valve seat 94 is decreased. Of course, when the current is removed and the coil is de-energized, springs 62a, 62b will bias the armature 60 so that the fluid control member 64 returns to the position in FIG. 1A wherein it is seated against the valve seat 94 and between circular flange 95. Obviously, this will prevent any fluid from flowing through the inlet port 90 to the outlet port 33 of the valve body.

As the springs used in the invention have a relatively high rate, and the armature has a relatively small mass, the system tends to be very responsive to changes in the current supplied to coil 40. The flat springs are designed to achieve a long life by means of the material selected and controlling the displacement so that the stress is kept to 20% of the maximum yield strength.

Adjustment to the valve may be made to vary the displacement of the fluid control member verses the electrical signal by loosening the lock nut 52 and rotating the pole piece 42 using a hex wrench or other tool in adjustment recess 49a. This will vary the gap 76 as external threads 48 of pole piece 42 are rotated relative to internal threads 38 of end. piece 22. The smaller the gap is, the stronger the magnetic attraction will be between the armature and the pole piece. Once the desired position of the pole piece is attained, the lock nut is retightened against the end piece 22. An adjustment to the valve may also be made by rotating the valve insert 66. The engagement of the threads on the valve insert with the threads on the valve body will cause the valve seat 94 and the fluid control member 64 to be raised or lowered as the valve insert is rotated.

Figure 4:
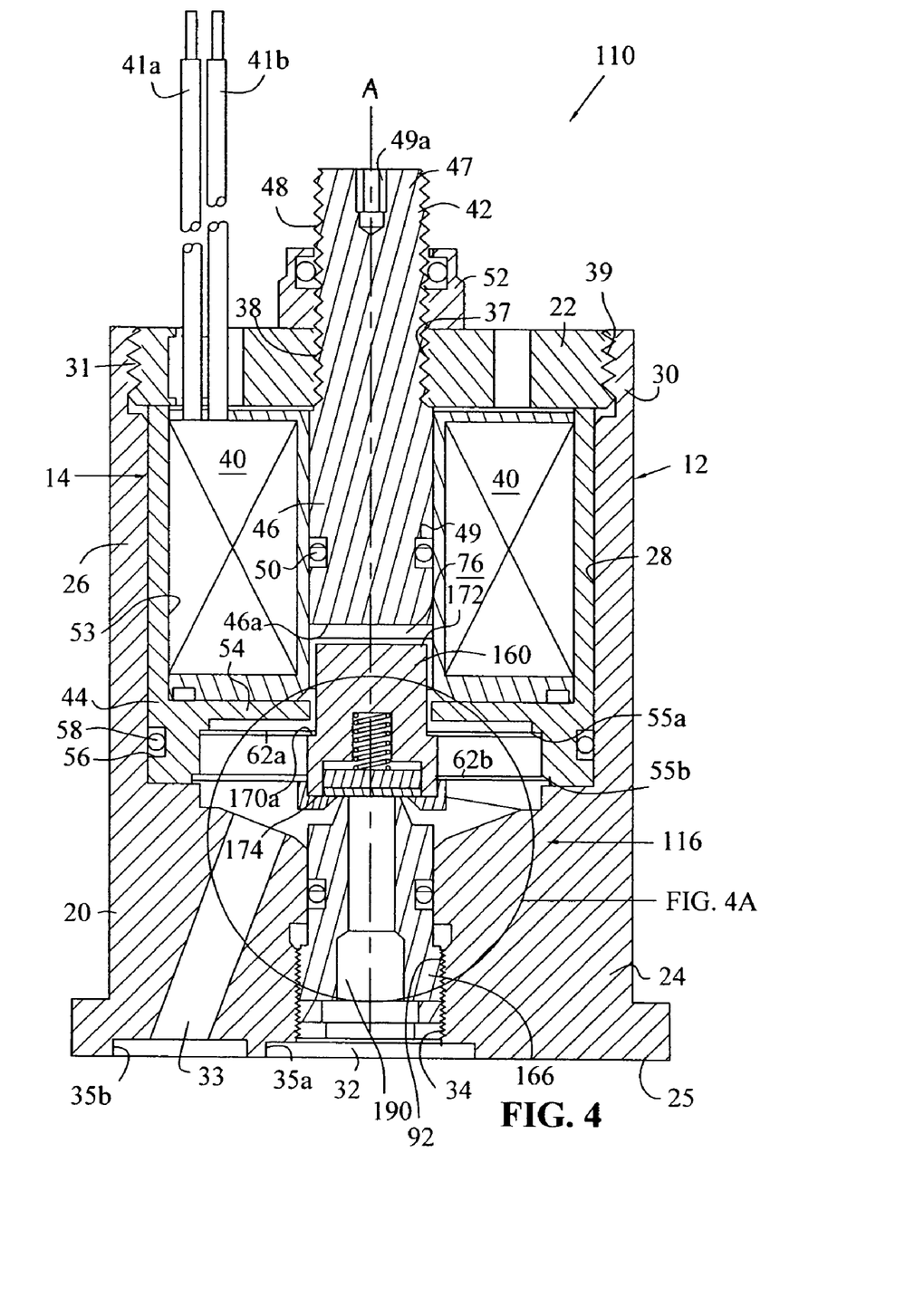
FIG. 4 is a cross-sectional view of an alternate embodiment proportional valve actuating apparatus with the valve in the closed position.
Figure 4A:
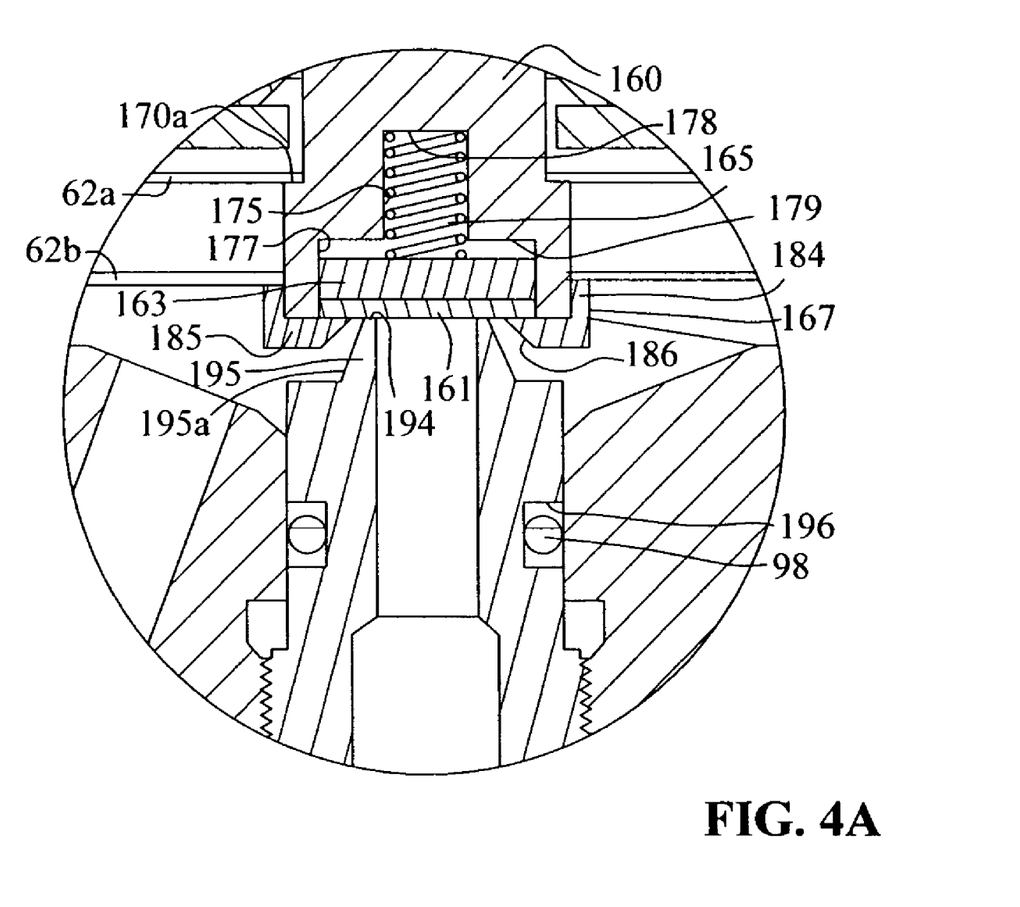
FIG. 4A is a close up view taken as shown in FIG. 4 of the seal member seated against the valve seat.

Referring now to FIGS. 4 and 4A, an alternate embodiment valve actuating apparatus is designated generally as 110. In the embodiment shown, valve actuating apparatus 110 is similar in all respects to valve actuating apparatus 10 except that it contains a modified valve assembly 116 that does not utilize a ball valve. Valve assembly 116 includes springs 62a, 62b, an armature 160, a sealing or fluid control member 161, a backing plate 163, a third spring 165, a valve insert 166, and a cap 167.

Armature 160 is comprised of a ferromagnetic material and has a generally cylindrical configuration. Armature 160 includes a circumferential shoulder 170a, but in the embodiment shown, the armature does not have a second integral circumferential shoulder as does armature 60. Armature 160 also includes an upper surface 172 and a lower surface 174. Lower surface 174 has a bore 175, with a counterbore 177 of increased diameter at the outer end thereof. Bore 175 includes an end surface 178 and a transition surface 179 extending outward to counterbore 177. Bore 175 is configured to receive third spring 165, and counterbore 177 is configured for receipt of sealing member 161 and backing plate 163.

In one embodiment, sealing member 161 has a generally disk-like shape and is made from an elastomeric material. Backing plate 163 is also shaped as a disk, and may have a diameter similar to that of sealing member 161. The backing plate may be made from a corrosion resistant material such as stainless steel or plastic to provide support for sealing member 161.

Cap 167 has a generally annular or ring-like configuration in one embodiment and an L-shaped cross section having a longitudinally extending leg 184 and an inwardly extended leg 185. Inwardly extending leg 185 has a tapered end 186.

Springs 62a, 62b may be of a similar design to that used in valve assembly 16 of valve actuating apparatus 10. The third spring 165, however, is a relatively soft coil spring in the embodiment shown.

Valve insert 166 has a generally cylindrical configuration and includes an inlet port 190 and external threads 192 for engaging internal threads 34 of inlet passage 32. Valve insert 166 also includes a valve seat 194 located at the end of a circular extension 195 that has an outer sloped or tapered surface 195a. An outer circumferential groove 196 is located in valve insert 166 for receipt of O-ring or sealing member 98 to preclude fluid leakage between valve body 20 and valve insert 166.

In assembling valve assembly 116, spring 165 is placed in bore 175 against surface 178. Backing plate 163 is then positioned against spring 165, and sealing member 161 is placed upon backing plate 163 as best shown in FIG. 4A. Cap 167 is used to secure sealing member 161, backing plate 163 and spring 165 within bore 175/counterbore 177 so that sealing member 161 is biased toward leg 185 of cap 167 by spring 165. Cap 167 may be secured on armature 160 using threads, an adhesive, or a press fit.

As with armature 60, a portion of armature 160 is inserted through central hole 82 of springs 62a, 62b such that spring 62a bears against shoulder 170a of the armature. Spring 62b bears against leg 184 of cap 167, which serves as the second shoulder in this embodiment. The outer portion of springs 62a, 62b bear against respective shoulders 55a, 55b of core member 44, the same as in valve assembly 16. The assembly is retained within housing 12 by end piece 22 as described above in the previous embodiment.

Valve insert 166 is threaded into inlet passage 32 of valve body 20 by engaging external threads 192 of the valve insert with internal threads 34 of the inlet passage. Valve insert 166 is threaded far enough into inlet passage 32 so that valve seat 194 bears against and forms a sealing engagement with sealing member 161 while coil 40 is in a non-energized state.

In operation, sealing member 161 and backing plate 163 are resiliently supported by spring 165 so that any dimensional instability of the elastomer associated with solvent swell or thermal expansion is absorbed by the spring and does not affect the initial gap 76 between armature 160 and pole piece 42. As the electromagnetic coil 40 is energized, armature 160 is attracted to pole piece 42, which pulls sealing member 161 away from valve seat 194. As with the previous embodiment, valve assembly 116 provides proportional control of the fluid flow based upon the current. Accordingly, the greater the current provided to the electromagnetic coil, the larger the magnetic field is in pole piece 42 such that the distance between sealing member 161 and valve seat 194 varies directly with the current. The valve may be adjusted by rotating pole piece 42 or the valve insert as discussed above.

In this embodiment, the valve assembly does not rely on the pressure of the fluid to maintain a ball against the armature. Rather, this means that the valve will operate under any fluid pressure, and the fluid flow may also be operated in a reverse direction so that passage 33 is the fluid inlet and passage 32 is the fluid outlet.

While the invention has been taught with specific reference to the above embodiments, one skilled in the art will recognize that changes can be made in form and detail without departing from the spirit and scope of the invention. For example, other springs, such as coil springs, may be substituted for the flat springs 62a, 62b. Also, any suitable configuration may be used for the housing, and the springs may be secured in a different manner than between the shoulders on the core member and the armature. The pole piece, the armature, the core member, and the valve insert may also be provided in other suitable configurations besides that shown that will not impair the function. For instance, a square or rectangular configuration could be used. In addition, the inlet port, valve seat and circular flange may be built into or attached to the valve body so that a separate valve insert is not required.

It should also be appreciated that other configurations may be possible for the passages and ports in the valve body. In addition, the location of the ports and passages is not limited as shown and may be anywhere the valve actuating apparatus that will provide the desired fluid flow characteristics.

Additionally, other solenoid configurations may be used and the pole piece configured accordingly. Also, although the above described embodiment provides proportional fluid control without the need of a permanent magnet in the solenoid assembly, a permanent magnet may be added to provide a constant predetermined magnetic flux density in the pole piece. The described embodiments are, therefore, to be considered in all respects only as illustrative and not restricted. As such, the scope of the invention is indicated and limited only by the claims rather than by the description or drawings.

What is claimed is:

1. A valve actuating apparatus for providing proportional control of a fluid flow, including:
   a housing having a valve body with an inlet port and an outlet port;
   a valve assembly including an armature, a movable fluid control member, and at least one spring biasing the armature into contact with the fluid control member; and
   a solenoid assembly including an electromagnetic coil and a pole piece, the pole piece and the armature defining a gap that decreases proportionally to the amount of current flowing through the electromagnetic coil.

2. The valve actuating apparatus as set forth in claim 1, wherein fluid flow from the inlet port to the outlet port proportionally increases as the gap decreases.

3. The valve actuating apparatus as set forth in claim 1, further including a valve seat and wherein the fluid control member is in contact with the valve seat to inhibit fluid flow through the apparatus when the electromagnetic coil is not energized.

4. The valve actuating apparatus as set forth in claim 3, wherein the fluid control member is a ball.

5. The valve actuating apparatus as set forth in claim 1, further including a core member having a central bore and a shoulder and wherein the armature and the spring are located substantially within the core member.

6. The valve actuating apparatus as set forth in claim 5, wherein the armature includes a shoulder and the spring is positioned between the shoulder on the armature and the shoulder on the core.

7. The valve actuating apparatus as set forth in claim 6, wherein the spring is a flat spring.

8. The valve actuating apparatus as set forth in claim 7, wherein the spring has a substantially circular configuration with a central hole, a portion of the armature is inserted through the hole, and the shoulder on the armature has an outer diameter that is greater than a diameter of the hole.

9. The valve actuating apparatus as set forth in claim 6, further including a second spring having a diameter that is greater than a diameter of the first spring and that is positioned between a second shoulder on the core member and a second shoulder on the armature.

10. The valve actuating apparatus as set forth in claim 7, wherein both of the springs are flat springs with centrally located holes, and a portion of the armature is inserted through the holes, the hole of the second spring having a diameter that is greater than the outer diameter of the first shoulder of the armature and smaller than an outer diameter of the second shoulder of the armature.

11. A valve actuating apparatus for providing proportional control of a fluid flow, including:
    a housing having a valve body with an inlet port and an outlet port;
    a valve assembly including an armature having first and second shoulders, and first and second springs for biasing the armature; and
    a solenoid assembly including an electromagnetic coil, a core member and a pole piece, the core member having a central opening and first and second circumferential shoulders, the shoulders being stepped so that the diameter of the central opening adjacent the second shoulder is greater than the diameter of the central opening adjacent the first shoulder, the first spring being positioned between the first shoulder on the armature and the first shoulder on the core member, and the second spring being positioned between the second shoulder on the armature and the second shoulder on the core member, the pole piece and the armature defining a gap that decreases proportionally to the amount of current flowing through the electromagnetic coil.

12. A valve actuating apparatus for providing proportional control of a fluid flow, including:
    a housing having a valve body with an inlet port and an outlet port;
    a valve assembly including an armature having first and second shoulders, and first and second springs for biasing the armature, wherein both the springs are flat springs, and one of the springs has a larger diameter than the other; and
    a solenoid assembly including an electromagnetic coil, a core member and a pole piece, the core member having a central opening and first and second shoulders, the first spring being positioned between the first shoulder on the armature and the first shoulder on the core member, and the second sprint being positioned between the second shoulder on the armature and the second shoulder on the core member, the pole piece and the armature defining a gap that decreases proportionally to the amount of current flowing through the electromagnetic coil.

13. The valve actuating apparatus as set forth in claim 12, wherein both of the springs have centrally located holes, and a portion of the armature is inserted through the holes.

14. The valve actuating apparatus as set forth in claim 13, wherein a diameter of the hole of the second spring is greater than an outer diameter of the first shoulder of the armature and smaller than a diameter of the second shoulder of the armature.

15. The valve actuating apparatus as set forth in claim 11, further including a movable fluid control member.

16. The valve actuating apparatus as set forth in claim 15, wherein the springs bias the armature into contact with the fluid control member.

17. The valve actuating apparatus as set forth in claim 16, further including a valve seat and wherein the fluid control member is in contact with the valve seat to inhibit fluid flow through the apparatus when the electromagnetic coil is not energized.

18. The valve actuating apparatus as set forth in claim 17, wherein the fluid control member is a ball.

19. The valve actuating apparatus as set forth in claim 15, wherein the fluid entering the inlet port is pressurized and pushes the fluid control member against the armature.

20. The valve actuating apparatus as set forth in claim 11, wherein at least one of the shoulders on the armature is defined by a ring attached to the armature.

21. The valve actuating apparatus as set forth in claim 20, further including a sealing member and a third spring.

22. The valve actuating apparatus as set forth in claim 21, wherein the ring is a cap, and the spring biases the seal towards the cap.

23. A valve actuating apparatus for providing proportional control of a fluid flow, including:
   a housing having a valve body with an inlet port and an outlet port;
   a valve assembly including an armature having first and second shoulders with different outer diameters, and first and second springs, the first spring being positioned against the first shoulder of the armature, and the second spring being positioned against the second shoulder of the armature; and
   a solenoid assembly including an electromagnetic coil and a pole piece, the pole piece and the armature defining a gap that decreases proportionally to the amount of current flow through the electromagnetic coil.

24. The valve actuating apparatus as set forth in claim 23, wherein the springs are flat springs with different diameters.

25. The valve actuating apparatus as set forth in claim 24, wherein at least one of the springs has a centrally located hole, and a portion of the armature is inserted through the hole so that the spring with the hole bears against one of the shoulders of the armature.

26. The valve actuating apparatus as set forth in claim 25, wherein both of the springs have holes, and a portion of the armature is inserted through the holes, the hole of the second spring having a diameter that is greater than the outer diameter of the first shoulder of the armature and smaller than the outer diameter of the second shoulder of the armature.

27. The valve actuating apparatus as set forth in claim 23, further including a movable fluid control member.

28. The valve actuating apparatus as set forth in claim 27, wherein the spring biases the armature into contact with the fluid control member.

29. The valve actuating apparatus as set forth in claim 28, further including a valve seat, the fluid control member being in contact with the valve seat to inhibit fluid flow through the apparatus when the electromagnetic coil is not energized.

30. The valve actuating apparatus as set forth in claim 29, wherein the fluid control member is a ball.

31. The valve actuating apparatus as set forth in claim 30, wherein the fluid control member is movable relative to both the armature and the valve seat.

32. The valve actuating apparatus as set forth in claim 27, wherein the fluid is pressurized and pushes the fluid control member against the armature.

33. A valve actuating apparatus for providing proportional control of a fluid flow including:
   a housing having a valve body with an inlet port and an outlet port;
   a valve assembly including an armature, and first and second flat springs with different diameters, the springs each having a hole therethrough, and a portion of the armature is inserted through the holes in the springs; and
   a solenoid assembly including an electromagnetic coil and a pole piece, the pole piece and the armature defining a gap that decreases proportionally to the amount of current flowing through the electromagnetic coil.

34. The valve actuating apparatus as set forth in claim 33, wherein proportional control of the fluid flow is obtained.

35. The valve actuating apparatus as set forth in claim 33, further including a sealing member and a third spring, the third spring biasing the sealing member.

36. The valve actuating apparatus as set forth in claim 35, further including a cap, the spring biasing the sealing member towards the cap.

* * * * *